United States Patent [19]

Weiler et al.

[11] Patent Number: 4,505,116
[45] Date of Patent: Mar. 19, 1985

[54] DUAL-CIRCUIT BRAKE CONTROL ARRANGEMENT

[75] Inventors: Rolf Weiler, Frankfurt-Sindlingen; Peter Böhm, Frankfurt am Main, both of Fed. Rep. of Germany

[73] Assignee: ITT Industries, Inc., New York, N.Y.

[21] Appl. No.: 314,276

[22] Filed: Oct. 23, 1981

[30] Foreign Application Priority Data

Dec. 5, 1980 [DE] Fed. Rep. of Germany ....... 3045814

[51] Int. Cl.³ .............................................. B60T 11/20
[52] U.S. Cl. ..................... 60/562; 60/579; 60/581; 60/547.1; 60/554
[58] Field of Search ............ 60/547.1, 550, 551, 60/581, 562, 589, 552, 553, 554, 579

[56] References Cited

U.S. PATENT DOCUMENTS

| | | | |
|---|---|---|---|
| 3,537,261 | 11/1970 | Belart | 60/562 |
| 4,137,718 | 2/1979 | Belart | 60/562 |
| 4,225,022 | 9/1980 | Belart | 60/562 |
| 4,244,185 | 1/1981 | Belart | 60/581 |
| 4,263,784 | 4/1981 | Steffes | 60/581 |
| 4,326,379 | 4/1982 | Dauvergne | 60/554 |
| 4,330,995 | 5/1982 | Miyakawa | 60/589 |

FOREIGN PATENT DOCUMENTS

2702820 7/1978 Fed. Rep. of Germany ........ 60/581

Primary Examiner—Abraham Hershkovitz
Attorney, Agent, or Firm—James B. Raden; Edward J. Brosius

[57] ABSTRACT

A master cylinder device for controlling the pressure of hydraulic braking fluid in two separate braking circuits of a hydraulic braking system includes a housing having two parallel and co-extensive pressure chambers each movably accommodating one master piston. A pressure element transmits the brake pedal force to one of the master pistons to pressurize the fluid present in a first pressure compartment and thus in the associated first brake circuit. A part of the thus pressurized fluid is diverted to an actuating compartment of the other pressure chamber to act on the other master piston and thus to pressurize the fluid present in the second pressure compartment and in the associated other brake circuit. When elevated pressure fails to develop in the first pressure compartment, the pressure element engages a tappet of the other master piston to mechanically displace the same in the actuating direction and thus to pressurize the fluid supplied to the other brake circuit. A brake booster may be connected to the housing of the master cylinder device and act on the pressure element to boost the actuating force acting on the pressure element.

25 Claims, 4 Drawing Figures

DUAL-CIRCUIT BRAKE CONTROL ARRANGEMENT

BACKGROUND OF THE INVENTION

The present invention relates to dual-circuit brake control arrangements in general, and more particularly to control arrangements of this type which incorporate a master cylinder device supplying two separate braking circuits with pressurized hydraulic braking fluid upon actuation of a brake pedal.

There are already known dual-circuit control arrangements of this type including a master cylinder device which defines a first pressure chamber slidably accommodating a first master piston, and a second chamber slidably accommodating a second master piston. In many conventional constructions of the control arrangements of this type, the second master piston is movable in the same direction as the first piston so long as the two separate braking circuits are intact, in that the pressure which develops in a first pressure compartment delimited by the first master piston in response to movement of the first piston in its actuating direction acts on that side of the second master piston which faces away from its associated second pressure compartment to displace the second master piston in the same actuating direction and thus to pressurize the hydraulic braking fluid present in the second pressure compartment. It is also known to mechanically actuate the second master piston in the event that the brake circuit supplied with the hydraulic braking fluid from the first pressure compartment becomes defective.

Tandem master cylinder devices as known, for instance, from the ATE Brake Handbook 6th edition, 1979, page 47, are being currently used as the basic equipment for dual-circuit hydraulic braking systems. In such tandem master cylinder devices, two master cylinders are united in a common housing, being arranged in series or in tandem with one another. Each of the master cylinder parts of this common housing slidably accommodates a master piston, so that the master pistons are arranged in tandem with one another as well. A first of these master pistons has a piston rod or extension which is acted upon by a brake actuating force upon brake pedal depression, so that the first master piston is displaced in its actuating direction and pressurizes the hydraulic fluid which is present in the first pressure compartment situated in front of the first master piston. When the first piston is displaced in the actuating direction, that is, toward the second master piston, the first piston first moves beyond a feeding port which initially communicated the first pressure compartment with a brake fluid supply reservoir, so that communication of the first pressure compartment with the supply reservoir is interrupted and the hydraulid brake fluid present in the first pressure compartment is pressurized during the further movement of the first master piston in the actuating direction. Since the thus raised pressure of the hydraulic braking fluid in the first pressure compartment is uniformly effective in all directions, it will also act on the second master piston to displace the same in the actuating direction and eventually to pressurize the hydraulic braking fluid present in the second pressure compartment situated ahead of the second master piston as well. This additional pressurization takes place after the second piston has been moved beyond its associated feeding port which serves the same purpose as the feeding port associated with the first piston. Thus, the pressure in both the first and second pressure compartments will be about the same.

The pressurized hydraulic fluid is admitted, through respective outlet ports, into the respectively associated separate brake circuits. Now, should a leak develop in the hydraulic braking circuit associated with the first pressure compartment, the pressure in the latter will not rise in response to the movement of the first master piston in the actuating direction, inasmuch as the hydraulic braking fluid will escape through the leak. When this happens, an engaging portion of the first master piston will engage a corresponding engaging portion of the second master piston, so that the actuating force is mechanically transmitted to the second master piston after the first master piston has moved through a predetermined distance, whereafter the pressure of the fluid present in the second pressure compartment and thus in the still intact braking circuit is increased. This expedient will keep the braking circuit associated with the second pressure compartment fully effective. On the other hand, if the leak occurs in the braking circuit associated with the second pressure compartment, no pressure build-up will take place in the second pressure compartment. Thus, no resistance will be offered to the movement of the second master piston in the actuating direction upon movement of the first master piston in the actuating direction until an engaging portion of the second master piston abuts a stop which is stationary relative to the master cylinder housing. Thereafter, the first master piston will pressurize the hydraulic braking fluid in the first pressure compartment and, consequently, the braking circuit associated with the first pressure comparment will remain fully effective.

Tandem master cylinder device have generally proven their utility even in conjunction with brake boosters, inasmuch as the actuating force with which either of the brake pedal or the brake booster acts on the first master piston is hydraulically transmitted to the second piston. This means that a hydraulic equalizing action takes place between two independent braking circuits due to the action of the second master piston, so long as both braking circuits are intact. Under these circumstances, the pressure conditions in the two separate braking circuits are almost the same as if the second master piston were not provided at all. In other words, except for a minute difference attibutable to the existence of frictional forces, the braking pressures in the two separate braking circuits are virtually the same.

As advantageous as the conventional tandem master cylinder devices are in many respects, they still have the disadvantage of being relatively long and thus requiring a correspondingly dimensioned available space for mounting.

There is already known, from the German Pat. No. 17 80 218, a dual-circuit master cylinder device including two master pistons which are received for axial sliding in two separate cylindrical bores extending parallel to one another. In this arrangement, which is often referred-to as twin arrangement, an actuating member acts on the two master pistons through a balancing bore equalizing beam. When the separate braking circuits are intact the master cylinder device of this construction acts in the same manner as a tandem master cylinder device, provided that the effective surfaces of the master pistons are half as large as those of the tandem-type master pistons. However, the functioning of the twin arrangement of this type becomes problematical when one of the braking circuits fails, inasmuch as the entire pedal force will act only on one half of the previously effective master piston surface and thus a different transmission ratio between the brake force on the brake pedal and the pressure in the intact braking circuit will be obtained. In other words, the same brake force applied by the driver of the vehicle in which the brake system is being used will result in a two-fold increase in the pressure in the still intact braking circuit after the other braking circuit has failed as compared to the situation existing prior to the failure and, consequently, the braking action of the brakes incorporated in this still intact braking circuit will be excessive.

Moreover, one of the main disadvantages of the aforementioned twin arrangement is the relatively costly and complicated construction of the lever mechanism that is being used to compensate for different movements of the master pistons. It is necessary to so construct this compensating mechanism as to achieve blocking of the same upon failure of one of the braking circuits to render it possible to still effectively operate the intact braking circuit. So far, no practical constructions capable of accomplishing this purpose have been developed.

There has also already been proposed, in the German published patent application No. DE-OS 26 15 805, a brake unit having two brake cylinders which are arranged side by side. However, in this arrangement, one of the brake cylinders accommodates an auxiliary piston which serves as a servomechanism in that it is acted upon by the brake pedal force to pressurize a hydraulic fluid which is then supplied to that side of the actual master piston which faces away from the pressure compartment. Upon failure of the servo-mechanism, the single master piston is directly acted upon by the brake pedal force. This arrangement is capable of controlling the pressure of the hydraulic braking medium only in one braking circuit, while another braking circuit is directly connected to a brake booster chamber.

Furthermore, the published German application No. DE-OS 27 45 514 discloses a master cylinder assembly for vehicle hydraulic braking systems. In this construction, two master cylinders are arranged in parallel side by side, in a common housing. In contrast to the present invention, however, each of these master cylinders has to be individually operated by its own brake pedal for braking the vehicle when both brake pedals are simultaneously depressed, and for steering the vehicle by independently selectively depressing the respective brake pedals. Thus, this arrangement, like those discussed above, leaves much to be desired as to its practicality, simplicity and utility.

SUMMARY OF THE INVENTION

Accordingly, it is a general object of the present invention to avoid the disadvantages of the prior art.

More particularly, it is an object of the present invention to provide an arrangement for controlling the pressure of hydraulic braking fluid in two separate braking circuits, which is not possessed of the disadvantages of the conventional control arrangment of this type.

It is a further object of the present invention to so construct a dual-circuit master cylinder device of the type here under consideration as to have a considerably shorter overall axial length than the conventional master cylinder devices.

Still another object of the present invention is to develop a master cylinder device which, despite its reduced axial length, does not sacrifice any of advantages of the tandem master cylinder devices.

It is an additional object of the present invention to so design the dual-circuit master cylinder device as to be combinable, in a simple manner and in a unitary construction, with a brake booster.

It is a concomitant object of the present invention to provide a master cylinder device which is simple in construction, inexpensive to manufacture and reliable in operation nevertheless.

In pursuance of these objects and others which will become apparent hereafter, one feature of the present invention resides in an arrangement for controlling the pressure of the hydraulic braking fluid in two separate braking circuits of a hydraulic braking system, which comprises a master cylinder device including housing means defining separate first and second chambers arranged side by side, first and second master pistons respectively movably received in the first and second chambers and delimiting therein respective first and second hydraulic braking fluid pressure compartments each of which communicates with one of the braking circuits; and means for applying the pressure prevailing in the first pressure comparment to that side of the second master piston which faces away from the second pressure compartment. The controlling arrangement of the present invention further includes means for pressurizing the hydraulic braking fluid at least in one of the pressure compartments in direct response to the application of an actuating force, including a pressure element mechanically connected to the first master piston and acted upon by the actuating force, and means for mechanically engaging the pressure element with the second master piston when the extent of movement of the first master piston relative to that of the second master piston exceeds a predetermined limit. Advantageously, the chambers are elongated and substantially parallel to one another, and both of the pressure compartments are situated at the same end of the respective chamber. The second master piston has two surfaces which face away from one another and one of which delimits the second pressure compartment while the other delimits an actuating compartment in the second chamber. Then, the applying means includes a connecting conduit which communicates the first pressure compartment with the actuating compartment.

In a currently preferred embodiment of the present invention, the housing means includes a common housing which defines both of the aforementioned chambers. This expedient results in a particularly compact structure of the master cylinder device which is especially suited for accomplishing the purposes of the present invention. In a further development of the basic concept of the present invention, the dual-circuit master cylinder device is connected to a brake booster. In this manner, there is obtained a particularly short lightweight assembly of the brake booster and the dual-circuit master cylinder device.

It is further advantageous when the pressure element is constructed as a pressure plate, and especially when the pressure element has a forked configuration.

When the two chambers are provided in the common housing, it is particularly advantageous when the connecting conduit which communicates the first pressure compartment with the compartment is situated in a partitiohing wall that separates the chambers from one another. Under these circumstances, the connecting conduit advantagously extends substantially parallel to the chambers from the aforementioned one end of the first chamber to the other end of the second chamber. This expedient advantageously utilizes the partitioning wall, which is to be provided in any event, for the accommodation of the connecting conduit therein.

To provide for a simple mechanical engagement between the pressure element and the second piston, the engaging means includes a tappet extending through the housing means from the actuating compartment into the path of movement of the pressure element in an actuating direction out of its rest position assumed when the actuating force has a zero magnitude. As considered in the actuating direction, this tappet has a dimension which is shorter than the distance between the pressure element in its rest position and the second piston by a distance at least corresponding to the extent of movement of the first master piston before the brake circuit communicating with the first pressure is filled. In this manner, there is provided a lost-motion mechanism which avoids engagement between the tappet and the pressure element even while the braking circuit communicating with the first pressure compartment is still intact, and thus the possibility of disturbing the balance between the pressures prevailing in the two separate braking circuits. A particularly advantageous embodiment of this concept is obtained when the tappet has a bore open toward the pressure element and extending in the actuating direction and when the engaging means further includes a guiding pin which is rigid with the pressure element and extends into the bore of the tappet.

According to a further advantageous aspect of the present invention, the pressure element is substantially circular as considered in a plane normal to the actuating direction and has a radial extension which extends into alignment with the tappet. When the pressure element is configurated in this manner, it will have a very low weight, which is important for reducing the inertia of the braking system.

The axial dimension of the unitary construction of the master cylinder device with the brake booster can be further reduced when the pressure element has a recess facing the brake booster, and when a reaction disc acted upon by the brake booster is accommodated in this recess.

In a currently referred embodiment of the present invention, the brake booster includes a diaphragm plate, and there is further provided a control housing which is detachably connected to the diaphragm plate. Advantageously, the connecting means which detachably connects the diaphragm plate to the control housing includes a bayonet connection which preferably includes bayonet type openings in the diaphragm plate and mushroom-shaped projections on the control housing which engage in the openings in the assembled condition of the arrangement. In this construction, the boosting force is directly transmitted from the diaphragm to the reaction disc, so that the axial length of the assembly is further reduced. Furthermore, the above-mentioned expedients will leave the control housing, which is generally made of a synthetic plastic material, free from the forces to be transmitted. As a result of the arrangement of the reaction disc in the recess of the pressure element, it is possible to attach the control housing by means of the bayonet connection described above, inasmuch as this bayonet connection does not have to transmit axial forces under these circumstances.

Advantageously, a control valve is arranged in at least one of the brake circuits. In a currently preferred construction of the master cylinder device, the second master piston has a through bore which opens into the second pressure compartment and the control valve includes a valve member spring-loaded in its opening direction and having a valve stem extending through the bore. There is further provided means for displacing the valve member into its open position, including a stop member stationary with respect to the housing means and extending into a path of movement of the valve stem with the second piston. The arrangement advantageously further includes a low-pressure supply reservoir, and means for communicating the supply reservoir with the bore of the second piston, such communicating means preferably including a feeding port in the housing means and a recess in the second piston which extends from the periphery of the second piston into alignment with the bore. The stop member is advantageously mounted in the feeding port, extends therefrom into the recess of the second piston and into alignment with the movement path of the valve stem/and has an internal through passage for the flow of hydraulic fluid between the supply reservoir and the recess. It is further advantageous to make the stop member elongated and longitudinally slotted.

According to a further concept of the present invention, the brake booster has a casing which is rigidly connected to the housing means of the master cylinder device. A particularly advantageous con-struction of the arrangement is obtained when the brake booster casing includes a first casing part rigidly connected with the housing means of the master cylinder device and having an external circumferential groove, a diaphragm having a marginal portion received in the groove and subdividing the interior of the casing into a vacuum chamber and to a working chamber, and a second casing part crimped into the groove and confining a marginal portion of the diaphragm between itself and the first casing part.

BRIEF DESCRIPTION OF THE DRAWING

Above-mentioned and other features and objects of this invention will become more apparent by reference to the following description taken in conjunction with the accompanying drawings, in which.

DETAILED DESCRIPTION OF THE PREFERRED EMBODIMENT

Figure 1:
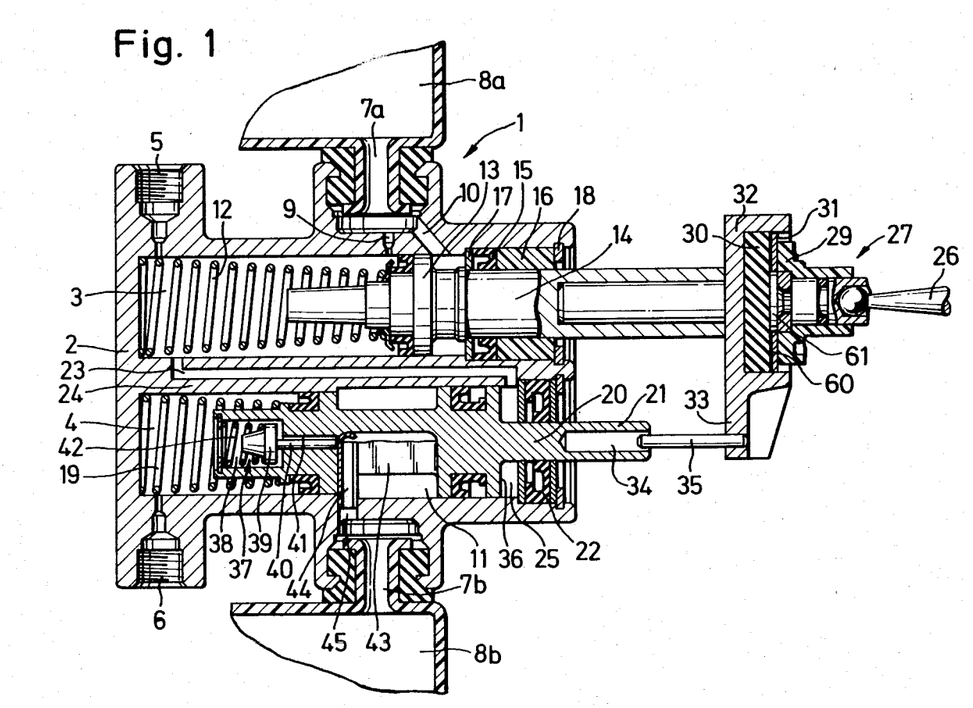
FIG. 1 is a longitudinal sectional view of a dual-circuit master cylinder device taken along the line I—I of FIG. 3.

Referring now to the drawing in detail, and first to FIG. 1 thereof, it may be seen that the reference numeral 1 has been used to identify a dual-circuit master cylinder device in its entirety. The master cylinder device 1 includes a first pressure chamber 3 and a second pressure chamber 4. The pressure chambers 3 and 4 are arranged side by side in a common housing 2. The housing 2 has a pressure port 5 for a first brake circuit, a pressure port 6 for a second brake circuit, and ports 7a and 7b. The port 7a connects a supply reservoir 8a via a feeding bore 9 with the first pressure chamber 3. The port 7b connectes a supply reservoir 8b with an annular chamber 11 of a second master piston 20 in a manner which will be described in more detail below. A feeding bore 10 extends from the port 7a and terminates in a chamber 3a of the bore which forms the first pressure chamber 3. The chamber 3a is disposed behind a first master piston 13.

The first master piston 13 is received in the first pressure chamber 3 for axial sliding in and opposite to the direction of the force of a restoring spring 12. The first master piston 13 has a coaxial extension or piston rod 14 which projects to the exterior of the housing 2. A seal which includes a gasket 15 and a sealing arrangement 16 and which is held in position by circlips 17 and 18 is provided at the zone through which the extension 14 passes between the exterior and the interior of the housing 2.

The second master piston 20 is accommodated in the second pressure chamber 4 for axial sliding in and opposite to the direction of the force of a restoring spring 19. The second piston 20 includes a coaxial tappet 21 which projects through a seal 22 to the exterior of the housing 2. Communication is established between the first pressure chamber 3 and an actuating chamber 25 provided in the second pressure chamber 4 via a connecting bore 23. The connecting bore 23 is situated in a partitioning wall 24 of the housing 2 which separates the pressure chambers 3 and 4 from one another. The actuating compartment 25 is situated behind the second master piston 20. Thus, the pressure which develops in the first pressure chamber 3 upon actuation of the master cylinder device 1 propagates through the connecting bore 23 into the actuating compartment 25.

Figure 2:
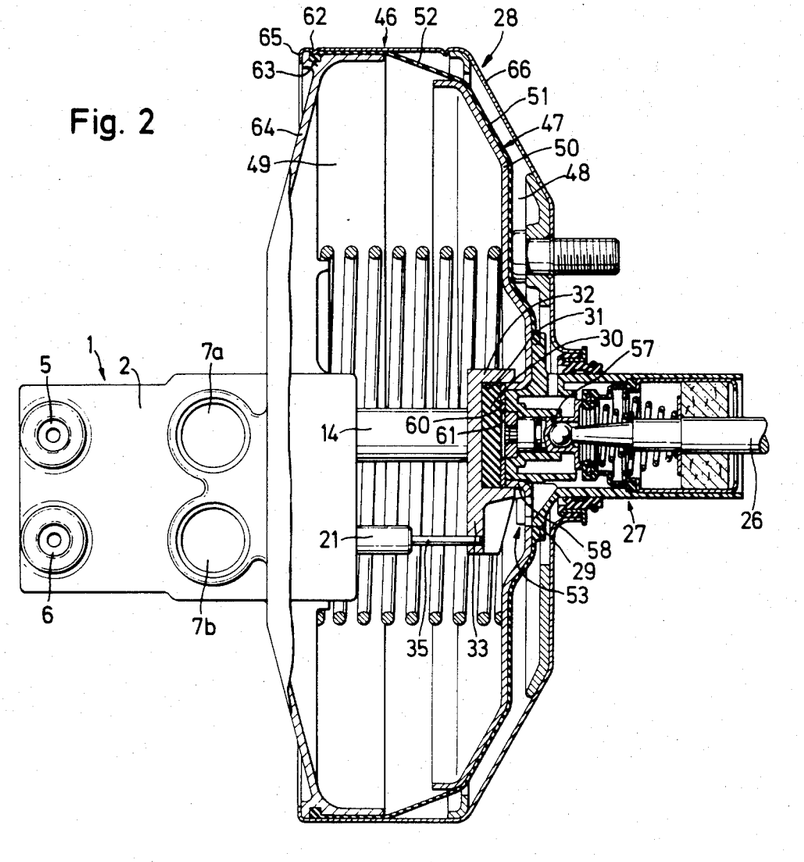
FIG. 2 is a partial longitudinal sectional view of an assembly including the dual-circuit master cylinder device of FIG. 1 and a brake booster.
Figure 3:
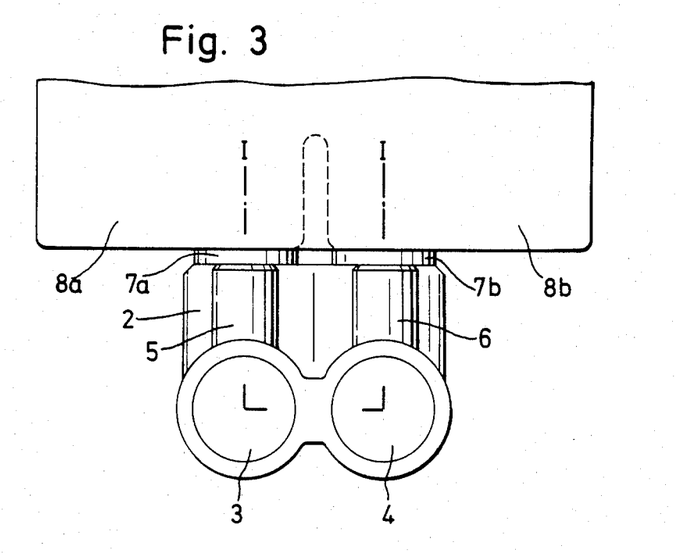
FIG. 3 is a partial side elevational view of the dual-circuit master cylinder device of FIG. 1.

As shown in FIG. 2, a connecting rod 26, which is connected to a brake pedal that is not shown, is axially slidably arranged in a brake booster 28. The front end of the connecting rod 26 acts via a control housing 29 on a reaction disc 30 that is accommodated in a recess 31 of a pressure element 32. The pressure element 32 abuts on its side close to the first master piston 13 against the extension 14 of the latter, so that any movement of the pressure element 32 is directly transmitted to the first master piston 13.

The pressure element 32 has substantially the shape of a circular plate which is provided with a radially outwardly extending extension 33. The extension 33 extends into alignment with the tappet 21 of the second master piston 20 to directly transmit the brake force to the second master piston 20 upon failure of the braking circuit associated with the first master piston 13. The proper position of the radial extension 33 of the pressure element 32 relative to the axially extending tappet 21 of the second master piston 20 is assured by providing the tappet 21 with an axial bore 34, and by mounting a pin 35 on the pressure element 32. The pin 35 is connected to the pressure element 32 by a press-fitting or a threaded connection. The pin 35 extends into the bore 34 of the tappet 21.

When the first braking circuit fails, the second master piston 20 can be directly actuated by the control valve of the brake booster 28 by way of its tappet 21. The moment which is thus applied to the pressure element 32 as a result of the radially offset location of the connecting rod 26 and of the tappet 21 relative to one another is counteracted by the surfaces which guide the first master piston 13 to which the pressure element 32 is connected in such a manner as to resist bending forces.

It is necessary to correlate the distance between the tappet 21 and the pressure element 32 in the rest position of the arrangement to the extent of the stroke of the first master piston 13. When the two brake circuits are intact, the tappet 21 always advances ahead of the pressure plate or element 32. Since the amount of hydraulic fluid which is to be fed into the first brake circuits before the latter is filled is known, it is possible to calculate the distance which is needed between pressure element 32 and the tappet 21 in the rest position of the arrangement to assure that no undesired engagement will take place therebetween as long as both braking circuits are intact, and this distance can be adjusted accordingly. Thus, the cooperation of the tappet 21 with the pressure element 32 provides a lost motion mechanism by which the extent of the lost motion can be adjusted to limit the extent of lost motion in the event of failure of the first brake circuit. In order to provide for this adjustment, the tappet 21 is connected, in a manner which has not been illustrated, with the second master piston 20 by a threaded connection which renders it possible to adjust the extent to which the tappet 21 projects from the second master piston 20.

In order to develop the same pressure in both brake circuits, the effective area of an actuating surface 36 of the second master piston 20 is made the same as the effective cross-sectional area of the first master piston 13. This means that the outer diameter of the pressure surface 36 is increased relative to that of the first master piston 13 by such an amount as to compensate for the loss of effective area occasioned by the presence of the tappet 21.

Since the two master pistons 13 and 20 can no longer be connected with one another as it occurs in conventional tandem master cylinder devices, a central valve 37 is preferably provided for both braking circuits. Such a central valve 37 is illustrated in FIG. 1 in association with the second master piston 20. This central valve 37 is open in the rest position of the arrangement in order to assure that the pressure of the hydraulic braking fluid in the associated brake circuit is relieved for most of the time.

The central valve 37 includes a valve member 39 which is received in a central recess 38 of the second master piston 20. The valve member 39 includes a valve stem 40 which extends through a longitudinally extending through bore 41 of the second master piston 20. The valve member 39 is urged in its closing direction by a valve spring 42. In the non-illustrated closed position of the valve member 39, in which the head of the latter closes the longitudinal bore 41 of the second master piston 20, the free end of the valve stem 40 which is remote from the valve head extends out of the longitudinal bore 41 into a recess 43 in the second master piston 20. This recess 43 extends transversely to the longitudinal bore 41 all the way to the periphery of the second master piston 20 at this region.

In the illustrated open position, the valve stem 40 engages a stop which is rigid with the housing 2. In the illustrated construction, the stop is constituted by a hollow, longitudinally slotted sleeve 44. The sleeve 44 is press-fitted in a port 45 of the housing 2 which communicates with the port 7b. The sleeve 44 is preferably of a resilient material to be frictionally held in the port 45 due to its herent resiliency. The sleeve 44 extends into the recess 43 in the second master piston 20 at least up to the path of movement of the valve stem 40 with the second master piston. The sleeve 44 and the recess 43 are so dimensioned as not to interfere with the movement of the second master piston 20. When the second master piston 20 is in its rest position, the valve stem 40 engages the sleeve 44 so that the central valve 37 is opened and the hydraulic fluid is permitted to flow through the longitudinal bore 41 of the second master piston 20 into an annular chamber 11 or further through an internal passage of the sleeve 44 to the port 7b.

Having so described the construction of the master cylinder device 2, the operation thereof will now be explained.

When the connecting rod 26 is displaced in the actuating or braking direction in response to the depression of the brake pedal, the first master piston 13 is moved in the actuating direction due to the action of the pressure element 32 thereon. Initially, the first master piston 13 will move beyond the feeding bore 9 so as to interrupt communication between a first pressure compartment situated in the first pressure chamber 3 ahead of the master piston 13 and the feeding bore 9. Thereafter, the pressure in the first pressure compartment will rise during further movement of the first master piston in the actuating direction. This increased pressure will propagate to the port 5 and thus into the first circuit, but also through the connecting conduit 23 into the actuating compartment 25 which is situated rearwardly of the second master piston 20. The action of this pressurized hydraulic fluid on the second master piston 20 will displace the latter in the actuating direction as well, so that the second master piston 20 will also become disconnected from its associated feeding bore. Thereafter, any further movement of the second master piston 20 in the actuating direction will result in an increase of the pressure of the hydraulic fluid present in a second pressure compartment which is situated in front of the second in the pressure chamber 4. Since the second master piston 20 acts only as an intermediary under these circumstances, the pressure developing in the second pressure compartment will correspond to that prevailing in the first pressure compartment. Consequently, the pressure of the fluid fed through the outlet port 6 into the second braking circuit substantially corresponds to that supplied through the outlet port 5 into the first braking circuit. During the initial phase of movement of the second master piston 20 out of its rest position, the valve spring 42 displaces the valve member 39 of the central valve 37 into its closed position, thus permitting the development of the required pressure in the second pressure compartment. Once the braking action is terminated, the connecting rod 26 and, consequently, the master pistons 13 and 20 will be moved back oppositely to the advancement direction due to the action of the associated compression springs 12 and 19 thereon. In the final stage of this return movement, the valve stem 40 of the valve member 39 will engage the sleeve 44, so that the valve member 39 is axially displaced relative to the second master piston 20. This results in the establishment of communication through the longitudinal bore 41 between the second pressure compartment of the pressure chamber 4 and the supply reservoir 8b.

Turning now to FIG. 2, it may be seen that it shows a control arrangement which includes, in addition to the master cylinder device 1, a brake booster 28. The brake booster 28 of this unit has a low-pressure casing 46. The interior of the casing 46 is subdivided by an axially movable wall 47 into a working chamber 48 and a low-pressure chamber 49. The axially movable wall 47 includes a diaphragm plate 50 and a flexible diaphragm 51 which is in contact with the diaphragm plate 50. The diaphragm 51 has a portion 52 which constitutes a seal between the outer periphery of the diaphragm plate 50 and the circumferential wall of the low-pressure casing 46.

Figure 4:
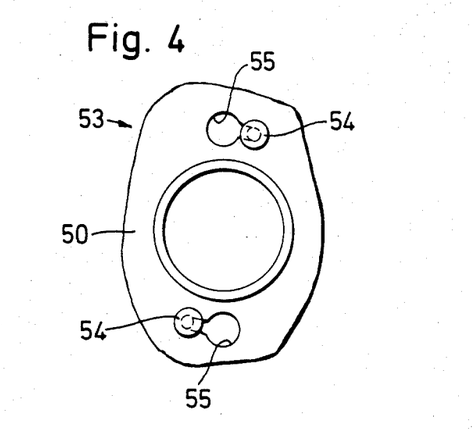
FIG. 4 is a partial top-plan view of a bayonet connection provided between a diaphragm plate and a control housing of the brake booster of FIG. 2.

The control valve 27 which is actuatable by the connecting rod 26 is connected with the diaphragm plate 50 by means of a bayonet connection 53. The bayonet connection 53 is shown in more detail in FIG. 4. The bayonet connection 53 includes mushroom-shaped pins 54 on a housing 29 of the control valve 27 which are received in and engage behind corresponding bayonet-type openings 55 provided in the diaphragm plate 50. The flexible diaphragm 51 will also be clamped between the control valve housing 29 and the diaphragm plate 50.

A control valve piston 57, which is axially movable by the connecting rod 26, is accommodated in a bore 56 of the control valve housing 29. The front end of the control piston 57 acts on the reaction plate 30 which is accommodated in the recess 31 of the pressure element 32.

A collar 58 of the diaphragm plate 50 extends into the recess 31 in the pressure element 32 with a minimum possible clearance. However, this clearance will have such dimensions as to allow relative movement between the pressure element 32 and the diaphragm plate 50. This limited relative movement is needed for insuring the required force distribution by means of the reaction disc 30. An annular disc 60 is inserted between the reaction disc 30 and the collar 58. The annular disc 60 serves to transmit the boosting force from the diaphragm plate 50 to a sufficiently large effective surface of the reaction disc 30. The intermediate disc 60 has a central bore 61. The control valve piston 57 extends through the central bore 61 of the intermediate disc 60 with a small clearance which permits relative movement between the intermediate disc 60 and the control valve piston 57. The reaction disc 50 is made of rubber or a similar elastic material, so as to behave, during the operation of the arrangement, in a manner reminescent of a liquid of very high viscosity. In other words, the reaction disc 50 distributes the forces acting thereon basically in accordance with the rules of hydrostatic behavior. In the illustrated rest position of the brake booster 28, a clearance is present between the end surface of the control valve piston 57 and the reaction disc 30. The existence of this clearance renders it possible to actuate the brake booster 28 by relatively small force.

During the assembly of the unit, two casing shells 64 and 66 of the low-pressure casing 46 are first brought together to such an extent that the first master piston 13 of the master cylinder device 1 becomes supported on the collar 58 of the diaphragm plate 50 via its piston rod or extension 14, the pressure element 32, the reaction disc 30, and the annular disc 60. When this position is assumed, that is, when the second master piston 13 and the diaphragm plate 50 abut against the respective limiting stops, manufacturing tolerances of the various components of the arrangement are compensated for. Then, the two casing shells 64 and 66 are interconnected in this position by providing indentations or crimps 62 in the casing shells 66 at the region of a groove 63 provided in the casing shell 64. Prior to the assembly of the casing shells 64 and 66, a marginal portion of the diaphragm 51 has been deformed around the casing shell 64. Thus, the indentations or crimps 62 force the marginal portion of the diaphragm 51 into the groove 63 and, consequently, the marginal portion of the diaphragm 51 is sealingly confined between the casing shells 64 and 66. To allow the formation of the indentation 62, the casing shell 66 is preferably of sheet material, especially of sheet metal. Finally, a protruding end portion 65 of the casing shell 66 is bent around the associated end of the casing shell 64.

While we have described above the principles of our invention in connection with specific apparatus, it is to be clearly understood that this description is made only by way of example and not as a limitation to the scope of our invention as set forth in the accompanying claims.

We claim:

1. An arrangement for controlling the pressure of hydraulic braking fluid in two separate braking circuits of a hydraulic braking system, comprising a master cylinder device including housing means defining separate first and second chambers arranged side by side, first and second master pistons respectively movably received in said first and second chambers and defining therein respective first and second hydraulic braking fluid pressure compartments each of which communicates with one of the braking circuits, and means for applying the pressure prevailing in said first pressure compartment to one of said braking circuits and to that side of said second master piston which faces away from said second pressure compartment to supply pressure fluid to the second of said braking circuits from said second pressure compartment; and means for pressurizing the hydraulic braking fluid at least in one of said pressure compartments in direct response to the application of an actuating force, including a pressure element mechanically connected to said first master piston and acted upon by the actuating force, and means for mechanically engaging said pressure element with said second master piston when the extent of movement of said first master piston relative to that of said second master piston exceeds a predetermined limit.

2. The arrangement as defined in claim 1, wherein said chambers are elongated and substantially parallel to one another; and wherein said pressure compartments are situated at the same end of the respective chambers.

3. The arrangement as defined in claim 2, wherein said second master piston has two surfaces facing away from one another and one of which delimits said second pressure compartment while the other delimits an actuating compartment in said second chamber; and wherein said applying means includes a connecting conduit communicating said first pressure compartment with said actuating compartment.

4. The arrangement as defined in claim 3, wherein said housing means includes a common housing defining both of said chambers.

5. The arrangement as defined in claim 4, wherein said common housing includes a partitioning wall separating said chambers from one another; and wherein said connecting conduit is situated in said partitioning wall and extends substantially parallel to said chambers from said one end of said first chamber to the other end of said second chamber.

6. The arrangement as defined in claim 3, wherein said pressure element is a pressure plate.

7. The arrangement as defined in claim 3, wherein said pressure element has a forked configuration.

8. The arrangement as defined in claim 3, wherein said engaging means includes a tappet extending through said housing means from said actuating compartment into the path of movement of said pressure element in an actuating direction out of its rest position assumed when the actuating force has a zero magnitude.

9. The arrangement as defined in claim 8, wherein, as considered in said actuating direction, said tappet has a dimension which is shorter than the distance between said pressure element in its rest position and said second piston by a distance at least corresponding to the extent of movement of said first master piston before the brake circuit communicating with said first pressure compartment is filled.

10. The arrangement as defined in claim 8, wherein said tappet is connected to said second master piston for joint movement therewith.

11. The arrangement as defined in claim 10, wherein said tappet has a bore open toward said pressure element and extending in said actuating direction; and wherein said engaging means further includes a guiding pin rigid with said pressure element and extending into said bore of said tappet.

12. The arrangement as defined in claim 8, wherein said pressure element is substantially circular as considered in a plane normal to said actuating direction and has a radial extension extending into alignment with said tappet.

13. The arrangement as defined in claim 1, and further comprising a control valve in at least one of the brake circuits.

14. The arrangement as defined in claim 13, wherein said second master piston has a through bore opening into said second pressure compartment; wherein said control valve includes a valve member spring-loaded in its opening direction and having a valve stem extending through said bore; and further comprising means for displacing said valve member into its open position, including a stop member stationary with respect to said housing means and extending into the path of movement of said valve stem with said second piston.

15. The arrangement as defined in claim 14, and further comprising a low-pressure supply reservoir, and means for communicating said supply reservoir with said bore.

16. The arrangement as defined in claim 15, wherein said communicating means includes a feeding port in said housing means and a recess in said second piston which extends from the periphery of said second piston into alignment with said bore.

17. The arrangement as defined in claim 16, wherein said stop member is mounted in said feeding port, extends therefrom into said recess of said second piston and into alignment with said movement path of said valve stem, and has an internal through passage for the flow of hydraulic fluid between said supply reservoir and said recess.

18. The arrangement as defined in claim 17, wherein said stop member is elongated and longitudinally slotted.

19. The arrangement as defined in claim 1, and further comprising a brake booster connected to said master cylinder device and operative for exerting said actuating force on said pressure element.

20. The arrangement as defined in claim 19, wherein said pressure element has a recess facing said brake booster; and further comprising a reaction disc accommodated in said recess and acted upon by said brake booster.

21. The arrangement as defined in claim 19, wherein said brake booster includes a diaphragm plate; and further comprising a control housing and means for detachably connecting said diaphragm plate of said brake booster to said control housing.

22. The arrangement as defined ih claim 21, wherein said detachably connecting means includes a bayonet connection.

23. The arrangement as defined in claim 22, wherein said bayonet connection includes bayonet-type openings in said diaphragm plate, and mushroom-shaped projections on said control housing which engage behind said openings in the assembled condition of the arrangement.

24. The arrangement as defined in claim 19, wherein said brake booster has a casing which is rigidly connected to said housing means.

25. The arrangement as defined in claim 24, wherein said brake booster casing includes a first casing part rigidly connected to said housing means and having an external circumferential groove, a diaphragm having a marginal portion received in said groove and subdividing the interior of said casing into a vacuum chamber and a working chamber, and a second casing part crimped into said groove and confining said marginal portion of said diaphragm between itself and said first casing part.

* * * * *